(12) United States Patent
Lim

(10) Patent No.: US 8,639,642 B2
(45) Date of Patent: Jan. 28, 2014

(54) METHOD FOR DETERMINING HARMFUL MULTIMEDIA CONTENT USING MULTIMEDIA CONTENT PLAYBACK CHARACTERISTICS

(75) Inventor: Jae Deok Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 217 days.

(21) Appl. No.: 13/333,455

(22) Filed: Dec. 21, 2011

(65) Prior Publication Data

US 2012/0166369 A1 Jun. 28, 2012

(30) Foreign Application Priority Data

Dec. 22, 2010 (KR) ........................ 10-2010-0132076

(51) Int. Cl.
*G06N 5/00* (2006.01)
(52) U.S. Cl.
USPC .............................................. 706/12; 706/45
(58) Field of Classification Search
USPC ...................................................... 706/12, 45
See application file for complete search history.

(56) References Cited

FOREIGN PATENT DOCUMENTS

KR    1020100027412    3/2010

OTHER PUBLICATIONS

Strachan, Continuity Monitoring of Audio, Video and Data in a Multi-Channel Facility, SMPTE 35th Advanced Motion Imaging Conference, 2002, pp. 1-8.*

* cited by examiner

*Primary Examiner* — Wilbert L Starks
(74) *Attorney, Agent, or Firm* — Nelson Mullins Riley & Scarborough LLP; Anthony A. Laurentano, Esq.

(57) ABSTRACT

A method for determining harmful multimedia content by using multimedia content playback characteristics includes: determining a local harmfulness of each basic unit section of multimedia content to generate a local determination result; and generating global determination results to complement an error of the local determination result based on the multimedia content playback characteristics. The global determination results are generated by using a continuous determination value which has a meaning of harmful or harmless and is updated depending on each local determination result and the number of continuous determination results is counted or initialized depending on continuity of the local determination results.

8 Claims, 4 Drawing Sheets

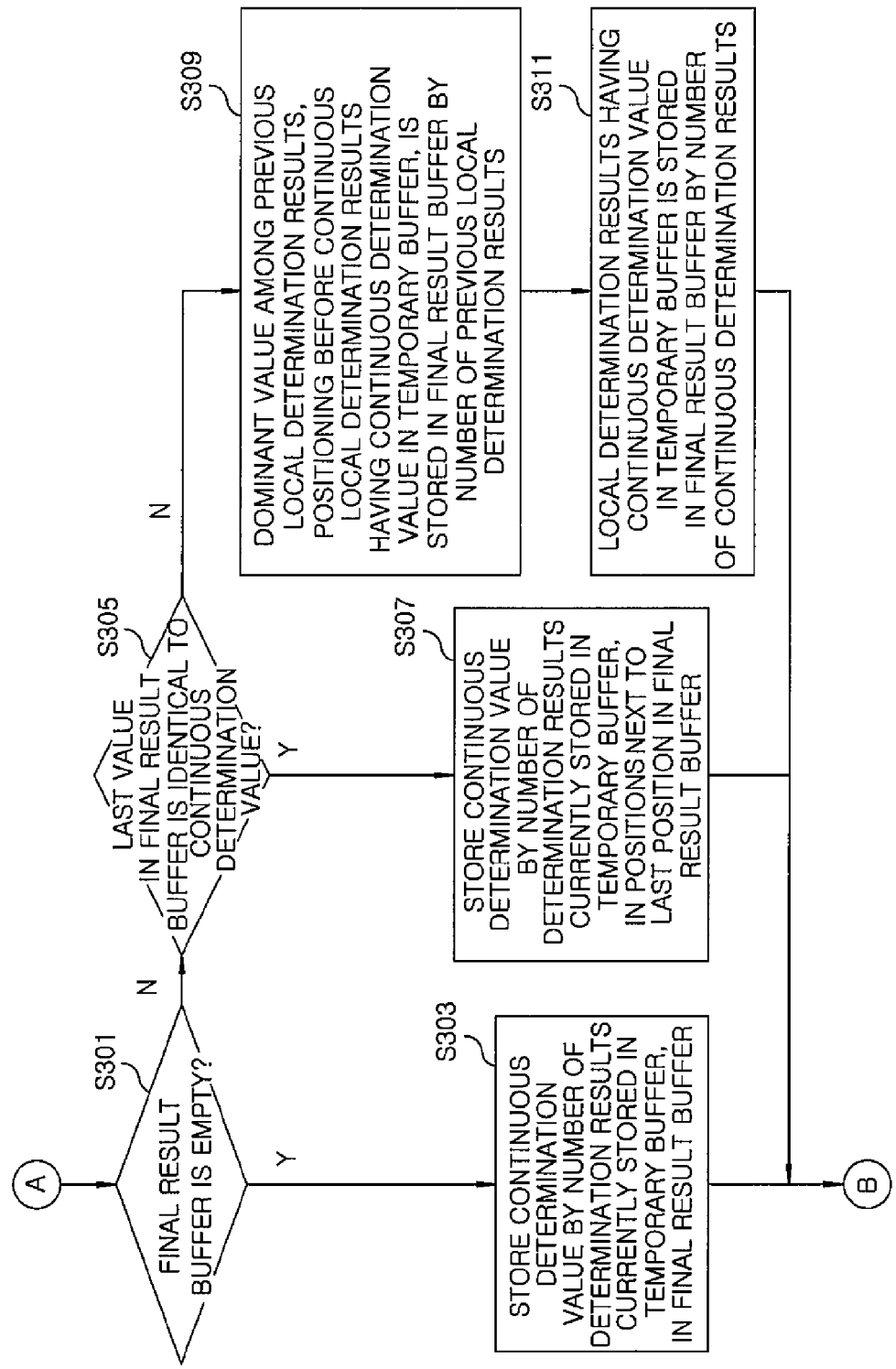

METHOD FOR DETERMINING HARMFUL MULTIMEDIA CONTENT USING MULTIMEDIA CONTENT PLAYBACK CHARACTERISTICS

CROSS-REFERENCE(S) TO RELATED APPLICATION(S)

The present invention claims priority of Korean Patent Application No. 10-2010-0132076, filed on Dec. 22, 2010, which is incorporated herein by reference.

FIELD OF THE INVENTION

The present invention relates to determination of harmful multimedia content, and more particularly, to a method for harmful content determination by using multimedia content playback characteristics, which can reduce an error locally generated in the contents by using the multimedia content playback characteristics.

BACKGROUND OF THE INVENTION

As well-known in the art, a method of classifying objects to be classified by making a database of the objects allows for accurate and fast classification but has a fatal disadvantage that an object not made for the database cannot be classified. This is a serious disadvantage for contents increasing over time.

Meanwhile, a machine learning-based classification method allows for classification of an unknown object, as well as a known object, through models generated based on machine learning, so it is commonly used for classifying and determining unspecified objects.

Determination through models based on machine learning, rather than the database scheme, is more effective in determining harmful multimedia content or a harmful section of multimedia content.

However, the machine learning-based model scheme has shortcomings in that accuracy of classification cannot be 100%. Thus, technical efforts of increasing the accuracy of determination up to nearly perfect have been actively made, but the 100% determination accuracy cannot be achieved, so the machine learning-based model scheme has a potential determination error in any event.

In determining the harmful multimedia content based on machine learning, conventional techniques mostly aim at increasing determination accuracy of a basic determination unit (minimum harmfulness determination unit) of an analysis and determination by using models generated based on machine learning in order to increase the accuracy of determination. For example, they improve the accuracy of a determination section by enhancing the characteristics to be used in the determination of a basic determination unit, or the like.

However, the conventional techniques of determining harmfulness of a basic determination unit have a problem in that it cannot decrease a local harmful content determination error to a satisfactory level.

SUMMARY OF THE INVENTION

In view of the above, the present invention provides a method for harmful content determination by using multimedia content playback characteristics, which can enhance harmfulness determination accuracy at a content level in a final determination process using determination results of a basic determination unit. That is, rather than simply making a final determination by synthesizing local determination results by using a model generated based on the machine learning in the content, a fragmentarily generated error of an analysis section is intended to be reduced at the content level by utilizing playback characteristics that while multimedia content is being played, a harmful portion thereof continues to be played at least for a certain period of time.

In accordance with an aspect of the present invention, there is provided method for determining harmful multimedia content by using multimedia content playback characteristics. The method includes: determining a local harmfulness of each basic unit section of multimedia content to generate a local determination result; and generating global determination results to complement an error of the local determination result based on the multimedia content playback characteristics.

BRIEF DESCRIPTION OF THE DRAWINGS

The objects and features of the present invention will become apparent from the following description of embodiments, given in conjunction with the accompanying drawings, in which:

FIGS. 3A and 3B are flowcharts for explaining a method for determining harmful multimedia content using multimedia content playback characteristics in accordance with the embodiment of the present invention.

DETAILED DESCRIPTION OF THE EMBODIMENT

Figure 1:
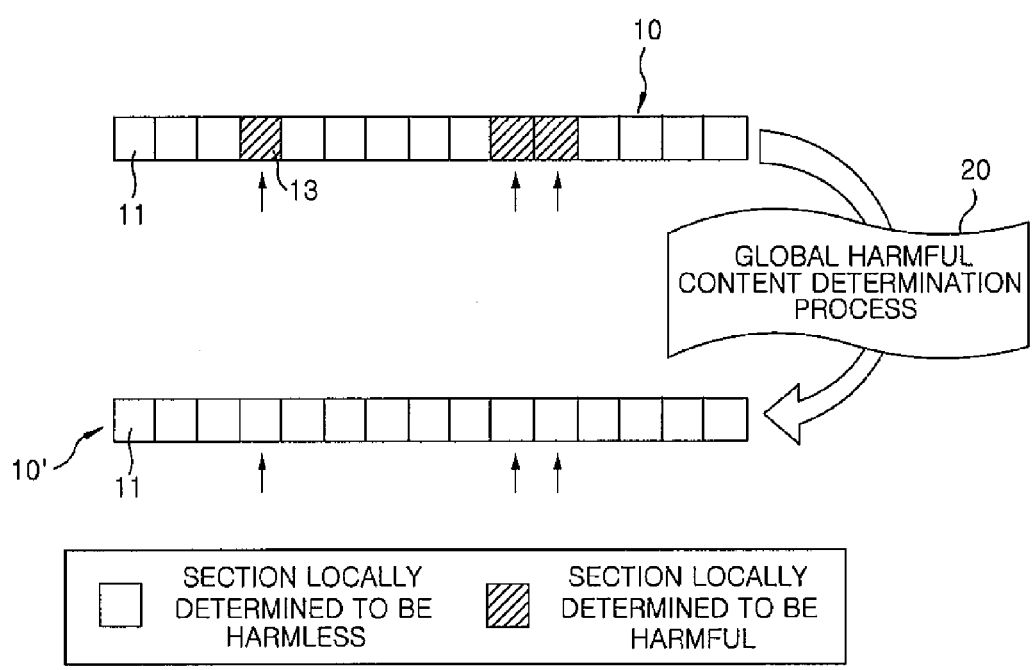
FIG. 1 is a view showing a concept of determination of harmful multimedia content in accordance with an embodiment of the present invention.

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

In the present invention, a determination error which may be generated in determining harmful multimedia content is corrected by using playback characteristics of harmful portions at a multimedia content level through the use of a machine learning-based content classification and determination technique. Multimedia content has playback characteristics in that once one sort of content is played, the same sort of content is played for a certain period of time. In other words, there are few cases in which a harmful image is played for a short time in a section during the playback of harmless images, or a harmless image is played for a short time in a section during the playback of harmful images. Thus, the determination error of a local determination section can be corrected by using such playback characteristics, and more accurate determination results can be provided at a content level.

In this manner, when the determination is made at the multimedia content level correction may be made by using content playback characteristics based on determination results of prior and posterior portions of a section to be currently determined, thus reducing a local determination error. For example, when the currently determined portion is determined to be harmless and a certain number of previous determined portions and a certain number of next determined portions are determined to be harmful, the currently determined harmlessness is highly likely to be a local determination error. In this case, the currently determined portion may be corrected to be harmful determination, thus providing more accurate determination results at the content level.

Hereinafter, an embodiment of the present invention will be described in detail with the accompanying drawings which form a part hereof.

FIG. 1 is a view showing a concept of determining harmful multimedia content in accordance with an embodiment of the present invention.

Referring to FIG. 1, reference numeral 10 denotes local harmfulness determination results obtained by dividing multimedia content into basic determination sections and then determining whether the basic determination sections are harmful based on machine learning. The results show that determination sections 13 locally determined to be harmful are placed as a single or double unit(s) between sections 11 locally determined to be harmless. As described above, according to the multimedia content playback characteristics, there are rare cases in which a harmful image is played for a short time during playback sections of harmless images, or a harmless image is played for a short time during playback sections of harmful images. Thus, the sections 13 hereof locally determined to be harmful are highly likely to be harmfulness determination errors.

When a global harmful content determination process 20 in accordance with the embodiment of the present invention is applied to the local harmfulness determination results 10, as an application result 10', the sections 13 which have been locally determined to be harmful may be finally determined to be harmless same as the sections 11, thus complementing an error of the local determination result 10. For example, as the harmfulness determination accuracy based on the learning model is high, the local harmfulness determination error appears very intermittently, and in this situation, the error can be corrected based on the local determination results positioned prior or posterior to a specific local harmfulness determination result. When the basic determination section is narrow, there are few cases in which a couple of harmful sections is suddenly generated for a short time and a harmless section is immediately generated. In FIG. 1, it is noted that the corresponding portion is an error when considering the front and rear situation of the basic determination sections determined to be harmful.

Figure 2:
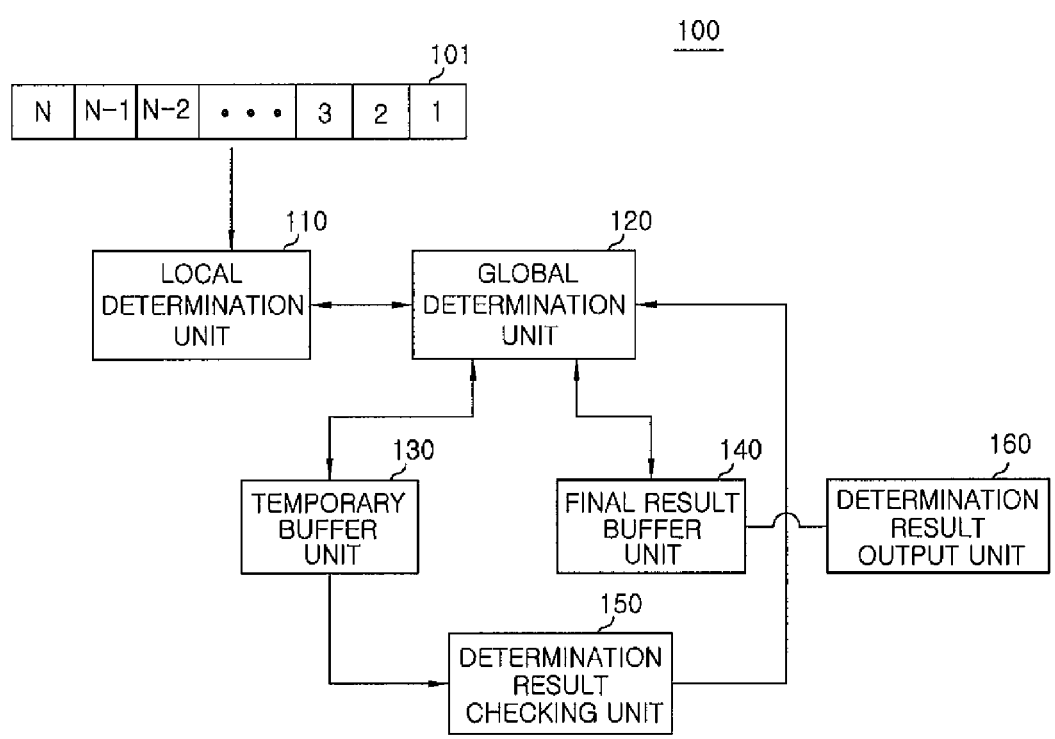
FIG. 2 illustrates a block diagram of an apparatus for determining harmful multimedia content using multimedia content playback characteristics in accordance with the embodiment of the present invention.

FIG. 2 illustrates a block diagram of an apparatus for determining harmful multimedia content using multimedia content playback characteristics in accordance with the embodiment of the present invention.

As shown in FIG. 2, a harmful multimedia content determination apparatus includes a local determination unit 110, a global determination unit 120, a temporary buffer unit 130, a final result buffer unit 140, a determination result checking unit 150, a determination result output unit 160 and the like.

Multimedia content 101, which is to be determined whether or not it is harmful, is divided into basic determination sections. In FIG. 2, the order of the divided basic determination sections for playback and determination is indicated by numbers. Namely, playback starts from a basic determination section 1 until a final basic determination section N, and the multimedia content 101 includes N number of basic determination sections. The local determination unit 110 determines harmfulness of each basic determination section of the multimedia content 101 to generate local determination results.

The global determination unit 120 generates a global determination result to complement an error of each local determination result by using a continuous determination value and the number of the continuous determination results based on the local determination result obtained from the local determination unit 110.

Herein, the continuous determination value has a meaning of 'harmful' or 'harmless' and is updated depending on each local determination result, and the number of continuous determination results is counted or initialized depending continuity of same local determination results.

The global determination unit 120 sequentially stores the local determination results on the respective local basic determination sections 1 to N determined by the local determination unit 110 in the empty temporary buffer unit 130 depending on performing conditions of the global determination process, or may immediately store the local determination results in the final result buffer unit 140.

The determination result checking unit 150 checks the value stored in the temporary buffer unit 130 to generate the continuous determination value and the number of continuous determination results, which are variables to be used in the global determination process. These variables reflecting playback characteristics of a video, which are used to check e continuity of the local determination results stored in the temporary buffer unit 130. For example, in case a local determination result on, e.g., the basic determination section 1 which has been determined to be harmful is provided when the temporary buffer unit 130 is empty, the provided determination result, namely, the harmfulness result sets the continuous determination value as 'harmful', and the number of the continuous determination results is '1'.

Thereafter, when the local determination result, e.g., on a basic determination section 2 is harmful, the continuous determination value remains to be harmful, and the number of continuous determination results increases to be '2'. Herein, if the local determination result on the basic determination section 2 which has been determined to be harmless, rather than harmful, is provided, the continuous determination value is updated to be harmless, and the number of continuous determination results is also initialized to be '1'. In other words, the variables are used to check the continuity of the local harmfulness determination results. The temporary buffer unit 130 may be empty or full based on an operation of the global determination process by the global determination unit 130. The size of the temporary buffer unit 130 may be adjusted to be appropriated depending on the length of the determination section. For example, when a determination section has a length of 10 seconds and five temporary buffers are provided, determination results on a maximum 50 seconds of playback sections may be stored.

The final result buffer unit 140 stores the result of the global determination process in which the local determination result is corrected. The result becomes the final determination result of each of the multimedia content determination sections, based on which whether a content level is harmful or harmless is performed.

The determination result output unit 160 may serve to output the global determination results stored in the final result buffer unit 140 to the outside.

Figure 3A:
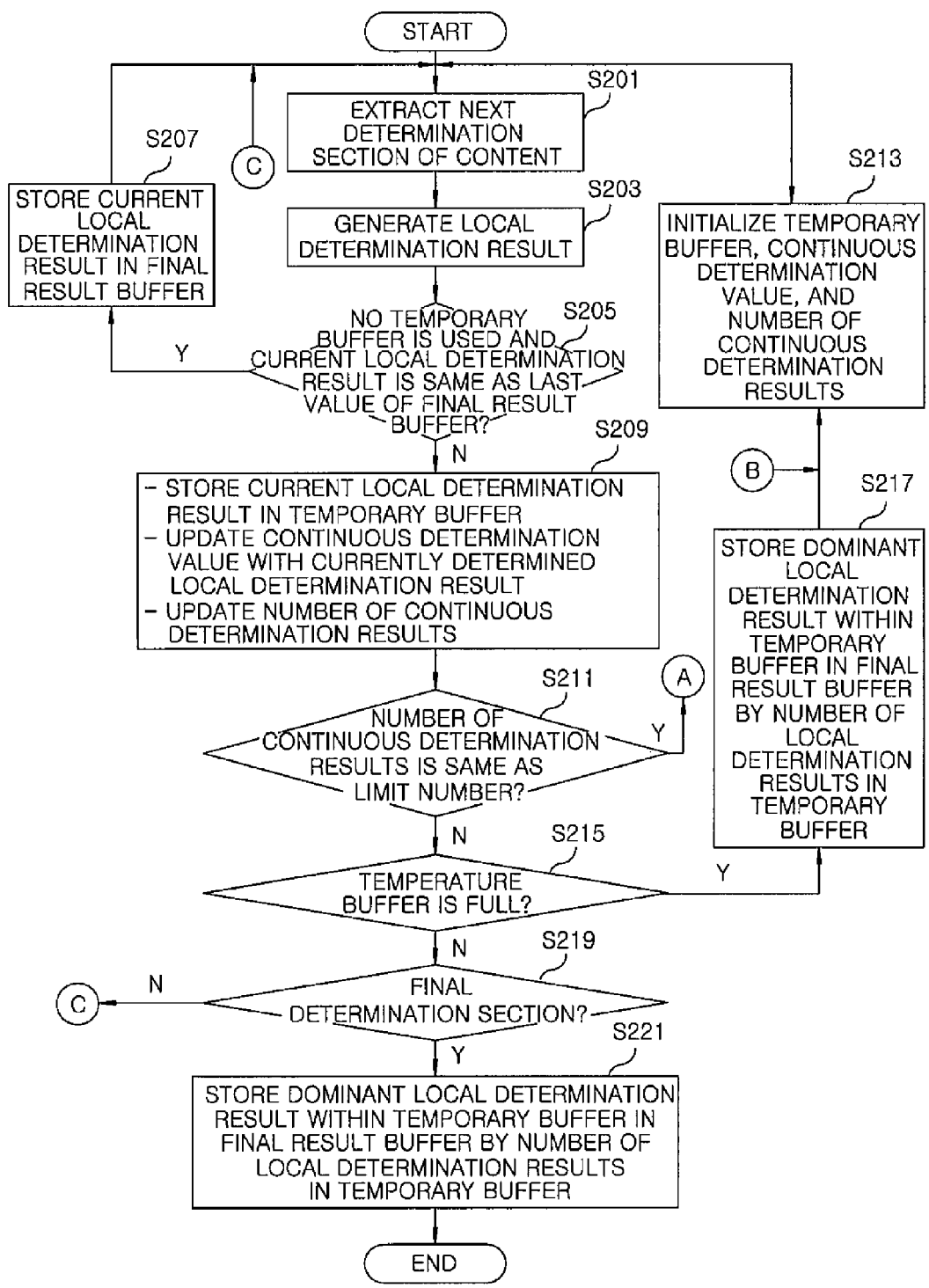

FIGS. 3A and 3B illustrate flowcharts for showing a method for determining harmful multimedia content by using multimedia content playback characteristics in accordance with the embodiment of the present invention.

First, when multimedia content is input, the local determination unit 110 extracts a basic determination section of the multimedia content in step S201; determines local harmfulness of the basic determination section to generate the local harmfulness determination result in step S203.

When the local harmfulness determination result is generated by the local determination unit 110, the determination result checking unit 150 checks whether or not no temporary buffer unit 130 is in use, and the determination result obtained in step S203 is identical to the last determination result stored in the final result buffer unit 140 and provides the same to the global determination unit 120 in step S205.

When no temporary buffer unit 130 is in use and the current local determination result is identical to the last determination result in the final result buffer unit 140, since it means that the same type of section is played as the previous determination result, so the global determination unit 120 admits the current local determination result as a global determination result and stores the same in the final result buffer unit 140 in step S207. Otherwise, i.e., the temporary buffer unit 130 unit is in use, and/or the current local determination result is different from the last determination result in the final result buffer unit 140, the global determination unit 120 stores the currently determined local determination result in the temporary buffer unit 130 for making a final harmfulness determination after checking following playback sections. Herein, when the previous determination result exists in the temporary buffer unit 130, the determination result checking unit 150 compares previous determination result with the current local determination result obtained in step S203 and updates the continuous determination value and the number of continuous determination results based on the comparison result.

For example, when the current local determination result is same as the previous determination result, the continuous determination value remains without any change, the number of continuous determination results is increased by 1. Otherwise, the continuous determination value is adjusted with the current local determination result, and the number of continuous determination results is adjusted to be 1 in step S209.

Thereafter, the determination result checking unit 150 provides the continuous determination value and the number of continuous determination results to the global determination unit 120. When the global determination unit 120 checks whether the number of the continuous determination results has been increased to be same as the limit number or not, in step S211. When the number of the continuous determination results has been increased to the limit number, the global determination unit 120 determines the continuous determination value transferred from the determination result checking unit 150 as a final determination value and stores it in the final result buffer unit 140 in steps S303, S307 and S311 as shown in FIG. 3B.

In FIG. 3B, the global determination unit 120 checks whether the final result buffer unit 140 is empty in step S301. When the final result buffer unit 140 is empty, the global determination unit 120 determines the current continuous determination value as a final result and stores the same in the final result buffer unit 140 in step S303. Herein, the continuous determination value is stored in the final result buffer unit 140 by the number of the local determination results stored in the temporary buffer 130.

When the final result buffer unit 140 is not empty, the global determination unit 120 compares the last value in the final result buffer unit 140 with the continuous determination value provided from the determination result checking unit 150 to check whether they are identical in step S305.

When the last value in the final result buffer unit 140 and the continuous determination value provided from the determination result checking unit 150 are identical, it means that the same type of multimedia content is played, so the global determination unit 120 stores the continuous determination value by the number of the continuous determination results transferred from the determination result checking unit 150 in positions next to the last value in the final result buffer unit 140 in step S307. When the last value in the final result buffer unit 140 and the continuous determination value (accumulated buffer value) are different, the global determination unit 120 makes a final determination by the following steps.

the most frequent value among previous local determination results, which position before continuous local determination results having the continuous determination value in the temporary buffer, by the number of the previous local determination results; and storing the continuous determination value into the final result buffer by the number of continuous determination results First, the most frequent value among previous local determination results, which position before continuous local determination results having the continuous determination value in the temporary buffer unit 130, is determined as the final determination value and is stored in the final result buffer unit 140 by the number of the previous local determination results in step S309.

Further, for the local determination results having the continuous determination value in the temporary buffer unit 130, the continuous determination value is determined as a final determination value and stored in the final result buffer unit 140 by the number of continuous determination results in step S311. In this case, e.g., when the number of determination results stored in the temporary buffer unit 130 is seven and the limit number, for which the same local determination result should be continued, is three, it means that the first to fourth continuous determination values of the temporary buffer unit 130 are not continued with a same value. In this case, as the final determination value of the first to fourth determination results in the temporary buffer unit 130, the most frequent value among the first to fourth determination results is finally determined and stored in the final result buffer unit 140 in step S309. The following continuous determination value is continued by the allowable number, so the continuous determination value is finally determined and stored in the final result buffer nit 140 in step S311.

When the number of the continuous determination results is smaller than the limit number set for a final determination in step S211, it is checked whether the temporary buffer unit 130 is full with the local determination results in step S215.

When the temporary buffer unit 130 is full with the local determination results, the most frequent value among the local determination results within the temporary buffer unit 130 is determined as the final determination value and stored in the final result buffer unit 140 by the number of the local determination results within the temporary buffer unit 130, i.e., the number of the buffers of the temporary buffer unit 130 in step S217. Here, the limitation in the size of the temporary buffer unit 130 is to limit an erroneous area of determination results to thus help reduce the erroneous area.

When the temporary buffer unit 130 is not full, it is checked whether or not a current determination result is from a final determination section in step S219. When the current determination result is from the final determination section, the most frequent value among the local determination results currently stored in the temporary buffer unit 130 is determined as a final determination value and stored in the final result buffer unit 140 by the number of the local determination results currently stored in the buffer unit 130 in step S221.

When step S303, S307, S311 or S217 is performed, the global determination with respect to the local determination results within the temporary buffer unit 130 have been entirely determined, and then, the temporary buffer unit 130 is initialized; and the continuous determination value, the number of the continuous determination results, and the like are initialized in step S213. Thereafter, a next local basic determination section is extracted, and the harmfulness determination process as described above is repeatedly performed.

In accordance with the embodiment of the present invention, a local content determination error is corrected by using the multimedia content playback characteristics, thus reducing a determination error due to the limitation of the harmfulness determination based on machine leaning. For example, the present invention may be applicable to the UCC service sites and video service sites that are problematic due to the distribution of obscene data to improve the accuracy of the determination results of harmful multimedia content.

In the harmfulness determination of multimedia content based on the machine learning, an error of local determination results which may be generated intermittently may negatively act on the determination of the content unit overall, which may resultantly affect the determination of the content unit. The intermittent error of the local determination results may be unavoidable, but in accordance with the embodiment of the present invention, the determination error which may be intermittently generated can be minimized, thus improving the determination performance in the content unit overall.

While the invention has been shown and described with respect to the particular embodiments, it will be understood by those skilled in the art that various changes and modification may be made without departing from the scope of the invention as defined in the following claims.

What is claimed is:

1. A method for determining harmful multimedia content by using multimedia content playback characteristics, the method comprising:
   determining a local harmfulness of each basic unit section of multimedia content to generate a local determination result; and
   generating global determination results to complement an error of the local determination result based on the multimedia content playback characteristics.

2. The method of claim 1, wherein, in said generating global determination results, the global determination results are generated by using a continuous determination value, which has a meaning of harmful or harmless and is updated depending on the local determination result, and using the number of continuous determination results which is counted or adjusted to 1 depending on a continuity of local determination results stored in a temporary buffer.

3. The method of claim 2, wherein said generating global determination results includes:
   determining whether the temporary buffer for storing the local determination results is not in use and whether a current local determination result currently generated is identical to the last value in a final result buffer storing the global determination results; and
   when the temporary buffer is not in use and the current local determination result is identical to the last value of the final result buffer, determining the current local determination result as a final determination value and storing the current local determination result in the final result buffer.

4. The method of claim 3, wherein, in said generating global determination results, when the temporary buffer is in use and/or when the current local determination result is different from the last value, the current local determination result is stored in the temporary buffer; and when a previous local determination result which is stored in the temporary buffer before the current local determination result is equal to the current local determination result, the continuous determination value is maintained and the number of the continuous determination results is increased, or when the previous local determination result is different from the current local determination result, the continuous determination value is updated with the current local determination result and the number of the continuous determination results are adjusted to be 1.

5. The method of claim 4, wherein said generating global determination results includes:

after the current local determination result is stored in the temporary buffer, checking whether the number of the continuous determination results has been increased to be same as a limit number set for a final determination; and when the number of the continuous determination results has been increased same as the limit number, generating the global determination results based on the local determination results stored in the temporary buffer and storing the global determination results in the final result buffer.

6. The method of claim 5, wherein said storing the global determination results in the final result buffer includes:

when the final result buffer is empty, storing the continuous determination value into the final result buffer by the number of the local determination results currently stored in the temporary buffer;

when the final result buffer is not empty and the last value of the final result buffer is equal to the continuous determination value, storing the continuous determination value in positions next to the last value in the final result buffer by the number of the local determination results currently stored in the temporary buffer; and when the final result buffer is not empty and the last value of the final result buffer is not equal to the continuous determination value, storing, in the final result buffer, the most frequent value among previous local determination results, which position before continuous local determination results having the continuous determination value in the temporary buffer, by the number of the previous local determination results; and storing the continuous determination value into the final result buffer by the number of continuous determination results.

7. The method of claim 5, wherein, when the number of the continuous determination results has not been increased to same as the limit number and the temporary buffer is full within a predetermined size, storing the most frequent value among the local determination results within the temporary buffer by the number thereof into the final result buffer.

8. The method of claim 7, wherein, when the number of the continuous determination results has not been increased to be same as the limit number; the temporary buffer is not full within the predetermined size; and a current determination section is the last determination section, storing the most frequent value among the local determination results within the temporary buffer by the number thereof in the final result buffer.

* * * * *